March 15, 1949.  E. L. WALKOWIAK  2,464,423
BALL BOLT GUARD
Filed Oct. 19, 1946

INVENTOR.
Edward L. Walkowiak.
BY
Frank C. Carman.
ATTORNEY

Patented Mar. 15, 1949

2,464,423

UNITED STATES PATENT OFFICE 2,464,423

BALL BOLT GUARD

Edward L. Walkowiak, Saginaw, Mich.

Application October 19, 1946, Serial No. 704,364

3 Claims. (Cl. 280—33.44)

1

This invention relates to guards for shielding and protecting the ball bolt of a trailer hitch when it is mounted in position on an automobile.

One of the prime objects of the invention is to design a ball bolt guard for shielding the ball bolt and preventing the bumpers of other vehicles riding over and becoming hooked thereon, thus necessitating raising the front end and bumper of one vehicle while depressing the rear end and bumper of the other vehicle sufficiently to permit the bumper to pass over the ball bolt and simultaneously pushing the vehicles from each other so that the vehicles will be unhooked.

A further object is to provide a neat appearing substantial ball bolt guard which can be adjusted upwardly to form a guard or shield for the ball bolt when the trailer is disconnected and the vehicle used in the ordinary manner, and which can also be adjusted downwardly out of the zone of operation of a trailer hitch to expose the ball bolt and permit the easy connection of the hitch thereto when desired.

A still further object is to design a guard which is capable of vertical adjustment with relation to the ball bolt, and which can also be swung horizontally and secured in said position when desired.

A further object still is to design a guard which can be easily and economically manufactured and assembled, and which when in position, harmonizes with the vehicle bumper with which it is associated.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

Figure 1:
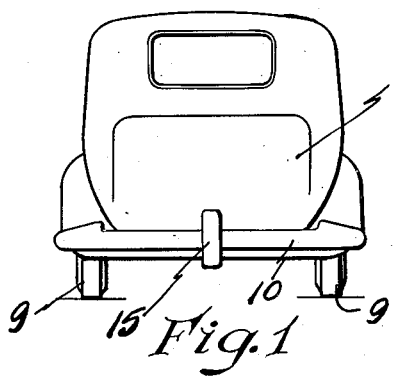
Fig. 1 is a rear-elevational view of an automobile with my ball bolt guard mounted in position thereon.
Figure 2:
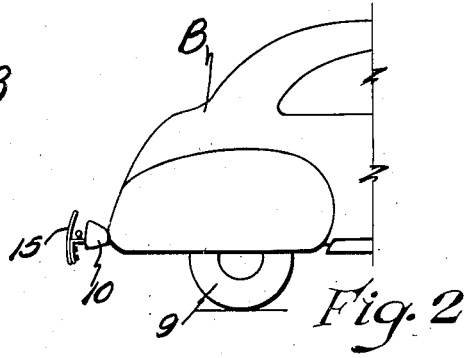
Fig. 2 is a fragmentary, side-elevational view thereof.

Referring now more specifically to the drawing in which I have illustrated the preferred embodiment of my invention. There is shown a conventional automobile body B mounted on ground-engaging wheels 9 and provided with a rear bumper 10 which is secured to the vehicle in any approved manner.

A draft bar 11 is secured to the vehicle frame (not shown), in any desired manner, and a ball bolt 12 is mounted on said draft bar, the stem 13 being threaded as usual, and a nut 14 serves to secure it rigidly in position.

The guard member 15 can be of any desired shape and design to harmonize with the vehicle bumper, and is adjustably mounted on a strap member 16, bifurcated as at 17 so that it straddles the neck of the ball bolt; thence the strap is bent downwardly as at 19, and the guard member 15 is adjustably attached thereto by means of bolts 20, lock nuts 21 being provided thereon to facilitate easy adjustment of the guard.

The guard 15 is preferably, but not necessarily, formed of strap material; this is slightly curved and comprises spaced-apart walls 22 and 23 respectively, the bolts 20 projecting through an elongated slot 24 provided in the section 23, the heads of the bolts 20 being accommodatted in the spaced between the guard walls.

The slot 24 permits the guard to be vertically adjusted, for instance, when the trailer hitch (not shown) is disconnected, the ball bolt 12 usually remains in position, and when the vehicle is parked and another vehicle is maneuvered to park in a limited space in the rear thereof, and as is necessary with parallel parking, the front bumper of the rear vehicle usually hooks over the ball bolt, locking the vehicles together so that it is necessary to depress the rear end of the one vehicle, and raise the front end of the other vehicle, simultaneously forcing the vehicles from each other.

Figure 4:
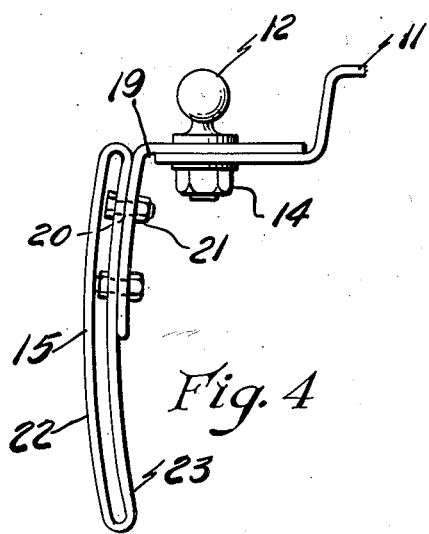
Fig. 4 is an enlarged, edge-elevational view of the ball bolt and guard, the guard being in its lowered position to permit attachment of a trailer hitch.
Figure 5:
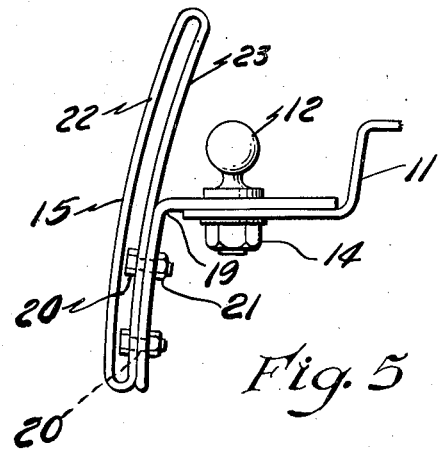
Fig. 5 is a view similar to Fig. 4 showing the guard in raised position to serve as a shield for the ball bolt.
Figure 3:
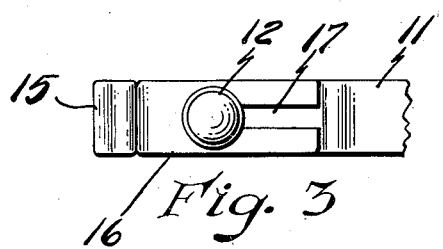
Fig. 3 is an enlarged, plan view showing the ball bolt and guard.

This raising and depressing of the bumpers causes broken and smashed fingers and legs, all of which is avoided by use of the instant invention, because, when the guard is in position shown in Fig. 5 of the drawing, it forms a smooth surfaced resilient standard, so that there can be no engagement of a bumper with the ball bolt, and when it is desired to attach a hitch (not shown), to the ball bolt, the nuts 21 are turned to loosened position, so that the guard proper can be adjusted to position as shown in Fig. 4 of the drawings; the nuts 21 are then tightened to eliminate rattling, and the ball bolt is freely accessible for attachment of the hitch.

Figure 6:
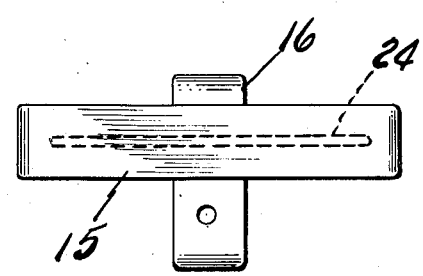
Fig. 6 is an enlarged, rear-elevational view showing the guard swung to horizontal position.

If for any reason it is desired to swing the guard to horizontal position, the lower bolt 20 can be removed, and the guard swung to position shown in Fig. 6 of the drawing, and the nut 21 is then tightened to hold it in this position.

The nuts 21 are of the type than can be hand-manipulated and locked in position; the guard is sufficiently resilient to eliminate breakage, etc., and the entire assembly is of neat and pleasing appearance and readily harmonizes with either plain bumpers or those of more elaborate design and configuration.

From the foregoing description, it will be clearly obvious that I have perfected a very simple, practical, and substantial ball bolt guard that can be readily manufactured and assembled and which can be easily and quickly adjusted.

What I claim is:

1. The combination with a draft bar having a ball bolt mounted thereon, of a resilient, downwardly depending bracket detachably secured thereto, and a vertically disposed guard slidably and adjustably mounted on said bracket and slidable vertically with relation to said ball bolt, said guard being adjustable in one position to effectively shield the ball bolt, and in another position to permit unobstructed connection of a trailer hitch thereto.

2. The combination as set forth in claim 1 in which the guard is formed with spaced-apart vertical walls forming an elongated opening therebetween, and bolts connecting the bracket and one of said walls with the bolt head accommodated and concealed between said walls.

3. The combination with a draft bar having a ball bolt thereon, of a substantially triangular shaped bracket having its one leg detachably connected to the bar with the opposite leg depending therefrom, a guard slidably mounted on the depending leg of said bracket provided with a vertically disposed slotted opening adapted to accommodate a bolt, said guard being adapted in one position to permit unobstructed attachment of a trailer hitch to the ball bolt, and in another position to form a vertical shield extending above the upper end of the ball bolt when the trailer hitch is detached.

EDWARD L. WALKOWIAK.

REFERENCES CITED

The following references are of record in the file of this patent:

UNITED STATES PATENTS

| Number | Name | Date |
|---|---|---|
| 2,173,276 | Jandus | Sept. 19, 1939 |
| 2,219,943 | Schuetz | Oct. 29, 1940 |
| 2,342,907 | Stall | Feb. 29, 1944 |